United States Patent [19]

Kühnle et al.

[11] 4,026,169
[45] May 31, 1977

[54] ELECTRO-HYDRAULIC CONTROL SYSTEM FOR SPEED-CHANGING MECHANISM SWITCHABLE UNDER LOAD

[75] Inventors: Willi Kühnle, Friedrichshafen; Heinz Wendler, Meckenbeuren; Manfred Glaser, Friedrichshafen; Harald Breisch, Kressbronn, all of Germany

[73] Assignee: Zahnradfabrik Friedrichshafen AG, Friedrichshafen, Germany

[22] Filed: July 3, 1975

[21] Appl. No.: 593,062

[52] U.S. Cl. .................................. 74/861; 74/335; 74/337; 74/865
[51] Int. Cl.² ...................... B60K 41/04; F16H 5/20; F16H 5/58; F16H 5/80
[58] Field of Search .................. 74/335, 336 R, 337, 74/843, 856, 865, 866, 877, 878, 860, 861; 192/.04, .052, .092

[56] References Cited

UNITED STATES PATENTS

| | | | |
|---|---|---|---|
| 3,583,422 | 6/1971 | Dach et al. | 137/116.3 |
| 3,662,625 | 5/1972 | Wakamatsu et al. | 74/866 |
| 3,718,056 | 2/1973 | Felder et al. | 74/865 |
| 3,750,495 | 8/1973 | Ito et al. | 74/866 |
| 3,868,869 | 3/1975 | Hunt et al. | 74/866 |

FOREIGN PATENTS OR APPLICATIONS

| | | | |
|---|---|---|---|
| 2,136,792 | 2/1973 | Germany | 74/335 |
| 1,939,457 | 2/1971 | Germany | 74/865 |

*Primary Examiner*—Samuel Scott
*Assistant Examiner*—Carl F. Pietruszka
*Attorney, Agent, or Firm*—Karl F. Ross; Herbert Dubno

[57] ABSTRACT

An automotive transmission with three or four stages corresponding to as many forward speeds, established by the activation of respective hydraulic coupling elements via associated electrical valve-operating switches, includes an individual delay network in the energizing circuit of each valve-operating switch for modifying its response time in dependence on load and on the direction of shift. By this modification an upshift under load or a downshift under pull proceeds with substantially immediate activation of one coupling element upon deactivation of another coupling element, whereas under other circumstances (downshift under load or upshift under pull) an appreciable hiatus occurs between deactivation and activation to take advantage of the intervening speed change. Discrimination between load and pull depends on the accelerator position whereas upshifting and downshifting are distinguished either mechanically, with the aid of a manually operated lever, or electrically on the basis of the state of activation of a coupling element of an adjoining stage. The delay networks retard either the deactivation or the activation of the associated coupling elements, depending on whether the latter are of the slow-operating or the fast-operating type.

10 Claims, 3 Drawing Figures

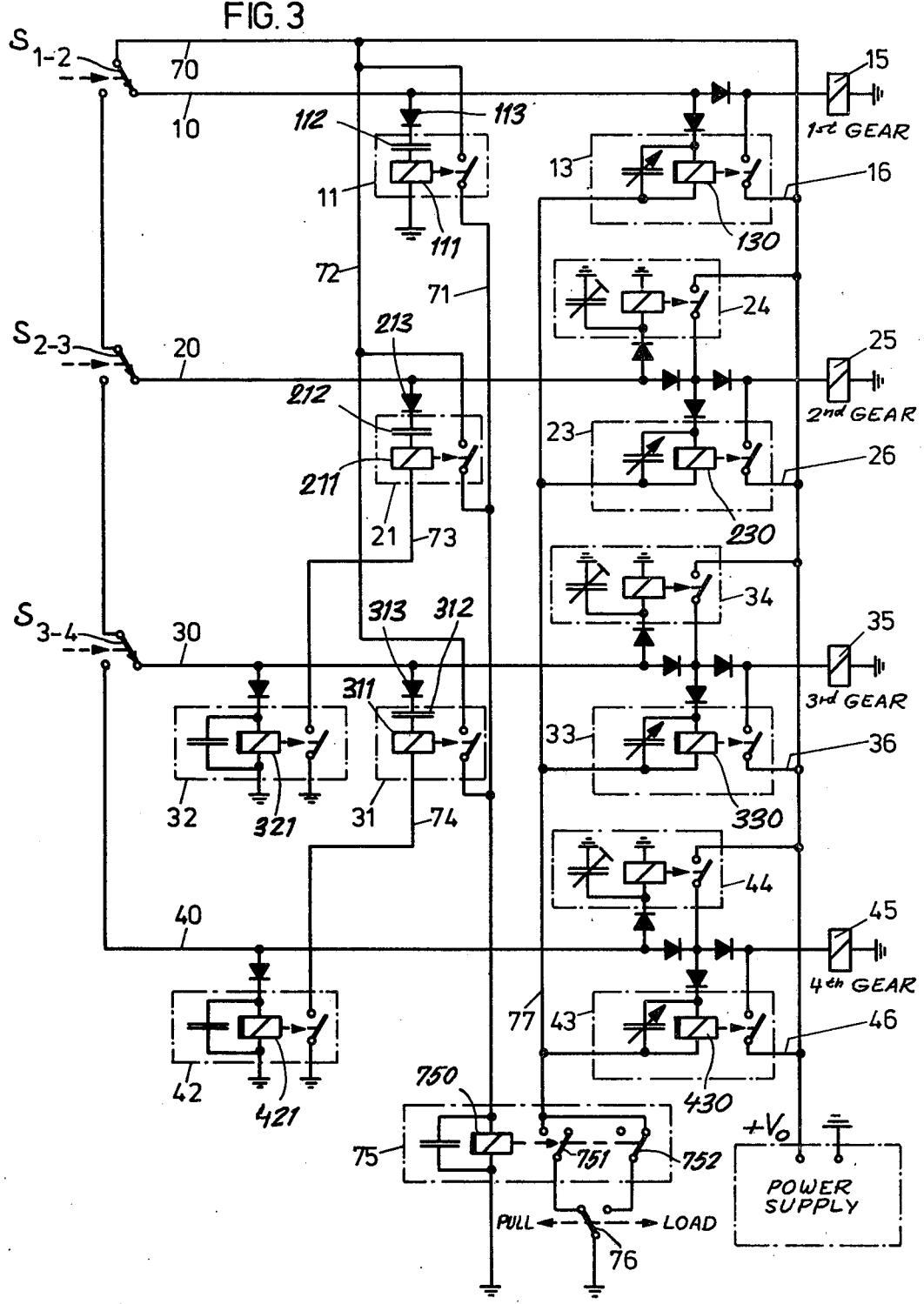

4,026,169

ELECTRO-HYDRAULIC CONTROL SYSTEM FOR SPEED-CHANGING MECHANISM SWITCHABLE UNDER LOAD

FIELD OF THE INVENTION

Our present invention relates to an electro-hydraulic control system for a speed-changing mechanism, e.g. as used in an automotive transmission, which is switchable under both positive and negative loads.

BACKGROUND OF THE INVENTION

With transmissions of the planetary-gear type it is known to establish different speed ratios between an engine and a load, such as the traction wheels of a vehicle, with the aid of hydraulic coupling elements such as clutches and brakes (also referred to as drive-establishing means) which are activable and deactivable by means of individual valve-operating switches responding to respective control signals from a selector circuit. In a system with three forward speed ratios or "gears", e.g. as described in commonly owned U.S. Pat. No. 3,580,109, two brakes and a clutch are used as the coupling elements; a fourth speed ratio can be realized with the addition of a third brake, e.g. as described in commonly owned U.S. Pat. No. 3,820,418, and so on. In each instance, only one of these coupling elements is activated at any time to establish the selected speed ratio; thus, a changeover from one speed ratio to another requires the deactivation of one coupling element simultaneously with or slightly before activation of another one.

For smooth shifting it is desirable that certain operating conditions be taken into account, particularly the sign of the reaction torque developed by the load. With positive reaction torques, as during acceleration or uphill driving of an automotive vehicle, upshifting — i.e. the transition from a lower to a higher speed ratio — should occur without significant hiatus in order to prevent any appreciable loss of momentum at a time when neither the lower-ranking nor the higher-ranking coupling stage is active. If, however, a downshift is to be carried out under load (i.e. in the presence of a positive reaction torque), such loss of momentum affords a smoother transition from a higher to a lower speed ratio; a short pause between the deactivation of a higher-ranking coupling element and the activation of a lower-ranking one is therefore not only permissible but also desirable under these circumstances. In the presence of negative reaction torques, i.e. with the load pulling (as during downhill driving or deceleration), the opposite is the case; a hiatus between deactivation of one coupling element and activation of another is then advantageous during upshifting but not during downshifting.

OBJECT OF THE INVENTION

The object of our present invention, therefore, is to provide an improved speed-changing mechanism taking these considerations into account.

SUMMARY OF THE INVENTION

This object is realized, in accordance with our present invention, by the provision of selection-responsive discriminating means for distinguishing between upshifting and downshifting commands and load-responsive discriminating means for distinguishing between positive and negative reaction torques. A switching circuit jointly controlled by the two discriminating means establishes a first changeover condition upon the coincidence of upshifting commands with negative torques and of downshifting commands with positive reaction torques; a second changeover condition is established by this switching circuit upon a coincidence of upshifting commands with positive reaction torques and upon the coincidence of downshifting commands with negative reaction torques. The first changeover condition introduces a predetermined delay period between the deactivation of a previously activated coupling element of an adjoining stage and the activation of a coupling element of a selected stage of the mechansim; the second changeover condition causes the activation of the coupling element of a selected stage to take place substantially concurrently with the deactivation of a previously activated coupling element of an adjoining stage.

The aforedescribed coupling elements may be divided into two classes, namely a fast-acting type and a slow-acting type. Clutches and brakes of the latter class are provided with dampers, e.g. as described in commonly owned U.S. Pat. No. 3,583,422, which introduce a substantial hydraulic retardation in the activation stroke. Depending on which type of coupling element is being used, a delay network in circuit with a selection relay associated with that element may modify the response time of that relay for retarding either the activation of a fast-acting coupling element to introduce a hiatus or the deactivation of a slow-acting element to suppress the hiatus otherwise present.

Since the optimum delay between deactivation and activation during upshifting (under pull) and during downshifting (under load) may not be the same, another feature of our invention involves the provision of impedance-changing means in the delay network of at least one stage, assigned to an intermediate speed ratio, responsive to the state of energization of the valve-operating means of an adjoining stage for making the delay period different for upshifting and downshifting operations.

BRIEF DESCRIPTION OF THE DRAWING

The above and other features of my invention will now be described in detail with reference to the accompanying drawing in which:

FIG. 3 is a circuit diagram representing a modification of the system of FIG. 1.

SPECIFIC DESCRIPTION

Figure 1:
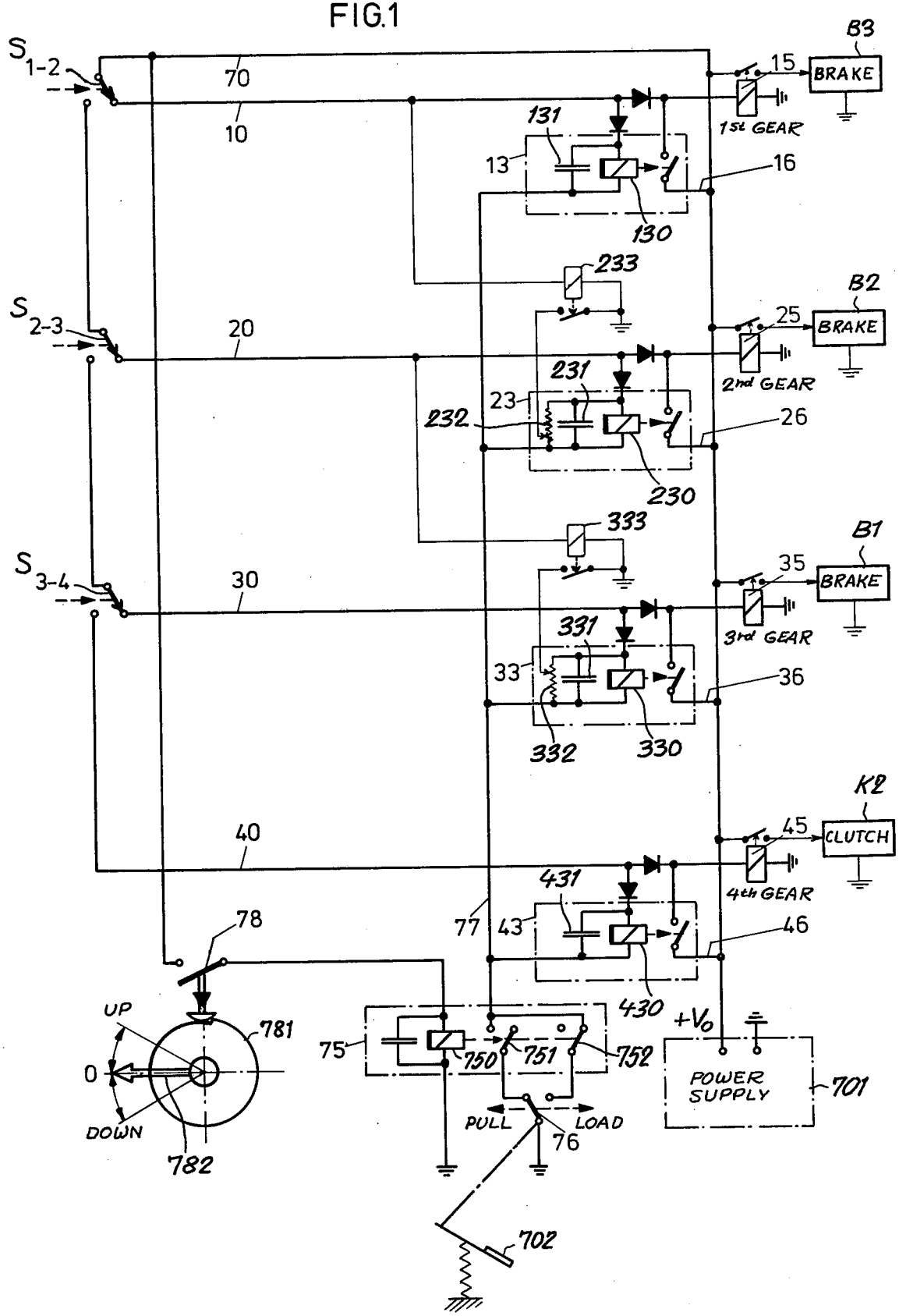
FIG. 1 is a circuit diagram of a control system according to our invention for a four-speed transmission including slow-acting hydraulic clutch and brake elements.

In FIG. 1 we have shown part of a conventional four-speed automotive transmission in which four speed ratios, referred to as first, second, third and fourth gear, can be selectively established by the activation of one of four hydraulic coupling elements to the exclusion of all the others, i.e. a brake B3 for "first gear", a brake B2 for "second gear", a brake B1 for "third gear", and a clutch K2 for "fourth gear" or direct drive. A power supply 701, not illustrated in detail, energizes a bus bar 70 with positive voltage $+V_0$ whenever the operator turns on the ignition or otherwise conditions the vehicle for forward drive; the part of the system serving for reverse drive has not been illustrated.

Admission of hydraulic fluid to brakes B3, B2 and B1 and clutch K2 is controlled, via valve-operating switches not separately illustrated, by respective selection relays 15, 25, 35 ad 45; it is to be understood that these relays and other components of the electric circuit may be realized as semiconductors, e.g. transistors.

Relays 15, 25, 35 and 45 are provided with respective energizing leads 10, 20, 30 and 40 to which control signals, in the form of positive voltage $+V_0$, may be selectively applied by three changeover switches $S_{1-2}$, $S_{2-3}$ and $S_{3-4}$. Switch $S_{1-2}$, which controls the transition between first and second gear, connects bus bar 70 either to lead 10 or to the next switch in cascade therewith, i.e. switch $S_{2-3}$ which controls the changeover between second and third gear. The latter switch, in turn, energizes either the lead 20 or the switch $S_{3-4}$ serving for a shift from third to fourth gear or vice versa.

An accelerator or gas pedal 702 controls, in the usual manner, the fuel supply to the nonillustrated vehicular engine. Generally, that pedal is depressed under load and released under no-load or pull conditions; thus, a two-position switch 76 mechanically coupled with pedal 702 serves as a load-responsive discriminator distinguishing between positive and negative (or zero) reaction torques. In its illustrated position "PULL", switch 76 is in series with an armature 751 of a slow-releasing relay 750 forming part of a selection-responsive discriminator 75 which distinguishes between upshifting and downshifting; in its alternate position "LOAD", switch 76 is in series with another armature 752 of that relay. Relay 750 also constitutes a two-position switch, with an "up" position (released) and a "down" position (operated) as will become apparent hereinafter.

Depending on the energized or de-energized state of relay 750, switch 76 grounds or open-circuits a lead 77 connected in parallel to four slow-releasing relays 130, 230, 330 and 430 included in respective delay networks 13, 23, 33 and 43 associated with selection relays 15, 25, 35 and 45. Each of these delay relays, when energized, closes a respective shunt path 16, 26, 36 and 46 for the energization of an associated selection relay independently of the position of changeover switches $S_{1-2}$, $S_{2-3}$ and $S_{3-4}$. The release time of the delay relays is codetermined by shunt capacitor 131, 231, 331, 431 and, in the case of relays 230 and 330, also by resistors 232 and 332 in parallel with capacitors 231 and 331. A part of resistor 232 is short-circuitable by a delay-modifying relay 233 connected between ground and the energizing lead 10 of the adjoining coupling stage; in an analogous manner, part of resistor 332 is short-circuitable by a delay-modifying relay 333 connected between ground and lead 20.

Relay 750 lies between bus bar 70 and ground in series with a normally open contact 78 controlled by a cam 781 rigid with a shift-selecting lever 782. That lever, normally biased into a neutral position 0, can be swung briefly in a clockwise sense for an upshift and in a counterclockwise sense for a downshift. Speed selectors adapted to be tripped in this manner are well known per se; for example, German published specification No. 2,136,792 of 1 Feb. 1973. Thus, a displacement of lever 782 in the "UP" direction reverses the changeover switch $S_{1-2}$ to shift from first to second gear; another such displacement thereafter reverses the switch $S_{2-3}$ for a shift to third gear, and so on. These operations do not affect the relay 750 whose armatures 751, 752 thus remain in the illustrated up position. Conversely, a displacement to the "DOWN" position restores the highest-ranking changeover switch previously reversed to shift from fourth to third, from third to second or from second to first gear. Cam 781 closes the contact 78 only in the case of a downshift, thereby energizing the relay 750 whose delayed release maintains that condition (down position) for a time sufficient to energize one of the delay relays 230, 330, 430, if switch 76 is in its illustrated position, upon the restoration of the corresponding changeover switch.

With contact 78 open and relay 750 released, delay relays 130 etc. can operate only under load, i.e. with gas pedal 702 depressed and switch 76 in its alternate position. Thus, for example, an upshift reversing the changeover switch $S_{1-2}$ closes an energizing circuit for relay 230 by way of the reversed changeover switch, the corresponding switch $S_{2-3}$ of the adjoining stage, leads 20 and 77, armature 752 and switch 76. With selection relay 25 now energized by way of lead 20, the closure of bypass path 26 by relay 230 is ineffectual at this time. Relay 130, however, which was energized over the same circuit 77, 752, 76 prior to reversal of switch $S_{1-2}$, is held operated for a limited period by the charge on capacitor 131 and, if desired, by an inherent slow-release characteristic of that relay. During that period, therefore, brake B3 remains effective while brake B2 is being slowly activated; the length of the delay period should be so selected that deactivation of brake B3 substantially coincides with activation of brake B2 without any objectionable overlapping. In an analogous manner, relays 230 and 330 delay the deactivation of brakes B2 and B1 during upshifting to the next-higher speed ratios.

With the transmission in fourth gear, i.e. with all three changeover switches reversed, the operator may wish to decelerate the vehicle by shifting to a lower speed ratio, the downshift thus occurring under pull with gas pedal 702 retracted and switch 76 in its illustrated position. The counterclockwise swing of lever 782 and cam 781 now closes the contact 78 and operates the relay 750 which reverses its armatures 751 and 752. Lead 77 is thus grounded for a period determined by the slow-releasing relay 750 which should be greater than the release period of any delay relay 130 etc. The restoration of changeover switch $S_{3-4}$ occurs a little after the energization of relay 750 so that relay 430 has time to operate, dropping out after a certain delay period to retard the release of relay 45 and the deactivation of clutch K2.

If, next, another counterclockwise rotation of lever 781 restores the changeover switch $S_{2-3}$, voltage $+V_0$ is reapplied to lead 20 and relay 25 reoperates to activate the brake B2. If the system is still under pull, i.e. if lead 77 is grounded just before the de-energization of lead 30 to operate the relay 330, the release of relay 35 and the deactivation of brake B1 are retarded. The energization of lead 20, however, operates the relay 333 which short-circuits part of resistor 332 so that the delay period of relay 330 is reduced, thereby introducing a slight gap between the deactivation of brake B1 and the activation of brake B2; this gap, of course, is substantially smaller than the hiatus occurring between deactivation and activation when relay 330 is unoperated, i.e. when the downshift occurs under load. Analogously, relay 233 modifies the delay time of relay 230, to foreshorten the holdover period of brake B2, upon a downshift under pull to second gear. No delay-modifying relays are needed in the first and fourth stages since there is no upshifting into first gear and no downshifting into fourth gear.

Obviously, the mode of operation of the delay-modifying relays 233, 333 could be reversed to provide for a gapless switchover on downshift (under pull) and a slight gap during switchover on upshift (under load) if a smoother transition can be achieved in this manner.

Figure 2:
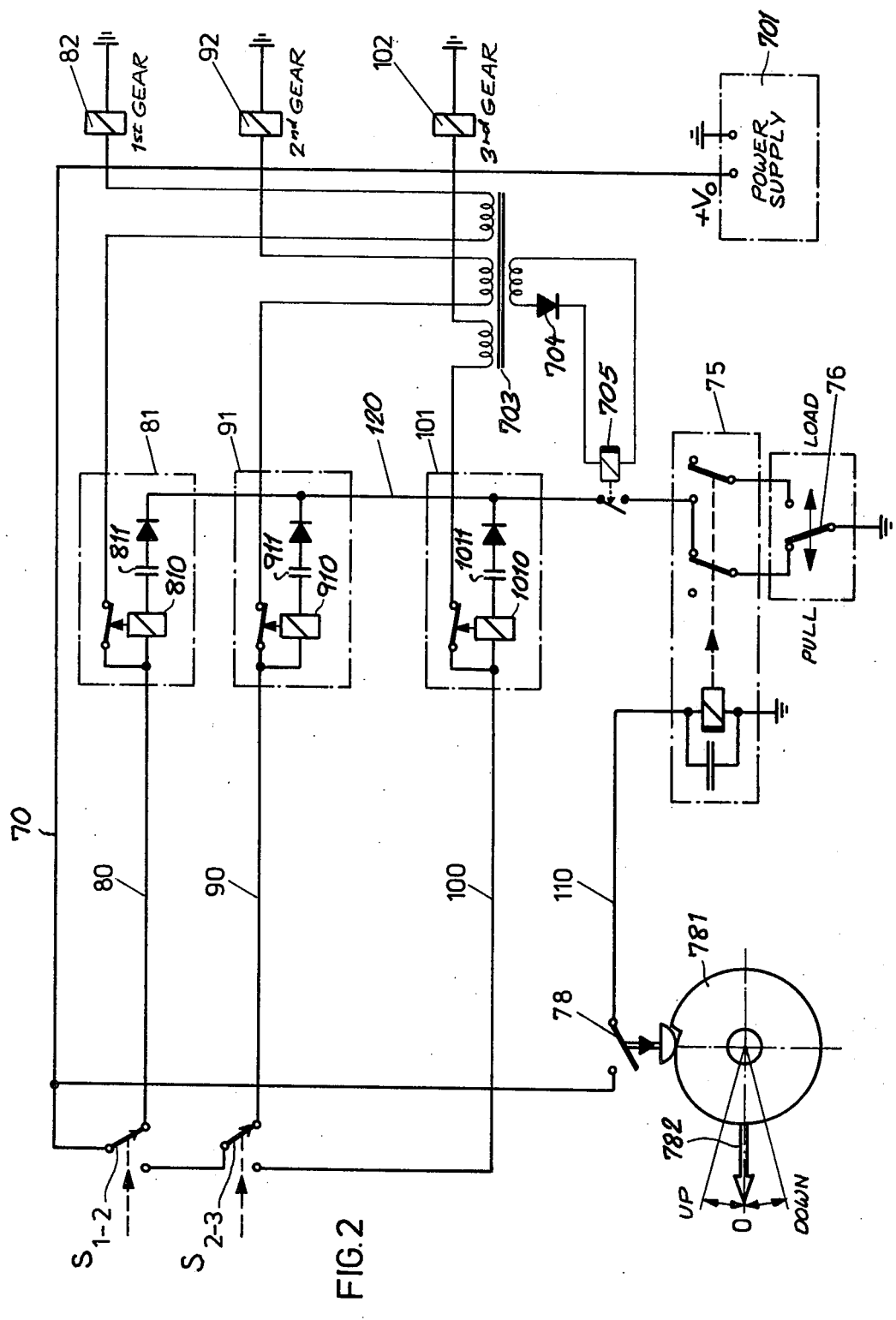
FIG. 2 is a circuit diagram of another embodiment serving a three-speed transmission with fast-acting clutch and brake elements.

Such delay-modifying means may also be used in the embodiments of FIGS. 2 and 3 but have not been illustrated there.

In the system of FIG. 2 it has been assumed that two brakes and a clutch (not shown) controllable by respective selection relays 82, 92 and 102 are of the fast-acting type so that a reversal of switch $S_{1-2}$, energizing a lead 90 in lieu of a lead 80, as well as a subsequent reversal of switch $S_{2-3}$, energizing a lead 100 in lieu of lead 90, results in virtually simultaneous deactivation of one coupling element and activation of the next-higher element during upshifting; such simultaneity would also exist when the coupling elements were activated in the reverse order during downshifting. In order to introduce the desired hiatus for an upshift under pull or a downshift under load, we have inserted respective delay networks 81, 91, 101 in leads 80, 90 and 100 including relays 810, 910 and 1010 whose windings are connected to a common lead 120 by way of respective series capacitors 811, 911 and 1011. These delay relays have back contacts normally extending the leads 80, 90, 100 to the respective selection relays 82, 92 and 102. With lead 120 grounded by way of discriminating switches 75 and 76, which operate in the manner described with reference to FIG. 1, the application of voltage to the corresponding lead 80, 90 and 100 briefly operates the associated delay relay to retard the energization of the respective selection relay. The delay period, in this instance, can be chosen more freely since it is not related to any hydraulic-retardation time of the controlled coupling element.

Since the initial energization of bus bar 70 from power supply 701 usually occurs with switches $S_{1-2}$ and $S_{2-3}$ in their illustrated position and with the gas pedal 702 (FIG. 1) retracted, thereby simulating a PULL condition, relay 810 would operate at that point to retard the activation of the first-gear brake. In order to obviate this unnecessary delay, we prefer to insert in leads 80, 90 and 100 three primary windings of a transformer 703 whose secondary is connected in series, via a diode 704, with a slow-releasing sensing relay 705 having a front contact inserted in lead 120. Diode 704 passes only transient pulses generated upon the de-energization of relay 82, 92 or 102, such a pulse operating the sensing relay 705 for a period outlasting the delay times of networks 81, 91 and 101. Upon the initial energization (e.g. at start or on switchover from neutral or reverse), none of the relays 82, 92 and 102 is energized and thus no transient pulse is generated in transformer 703.

The system illustrated in FIG. 3 includes selection-discriminating means independent of a manual speed-selecting lever and is therefore particularly adapted for use with automatic transmissions. As in FIG. 1, three brakes and one clutch (not shown in FIG. 3) of the slow-acting type are used to establish four different speed ratios; it will be apparent, however, that the system of FIG. 2 with its fast-acting coupling elements could be similarly modified for automatic speed change. Since transistions to first and fourth gear invariably involve a downshift and an upshift, respectively, no selection discriminator is needed for the first and fourth stages.

In FIG. 3, relay 750 in switching network 75 lies between ground and an ancillary bus bar 71 which is connectable to a branch 72 of bus bar 70 by front contacts of three relays 111, 211, 311 forming part of respective one-shot pulse generators 11, 21, 31, each of these relays being in series with a respective capacitor 112, 212, 312 and diode 113, 213, 313 so as to operate only for a brief period when the corresponding lead 10, 20, 30 is driven positive upon incipient energization of one of the selection relays 15, 25, 35. In the case of relays 211 and 311, their energizing circuits 73, 74 also include front contacts of respective relays 321, 421 forming part of timing networks 32, 42 generally similar to delay networks 13, 23, 33, 43. Relays 321 and 421 operate in parallel with relays 35 and 45, respectively, i.e. in positions $3^{rd}$ GEAR and $4^{th}$ GEAR. Thus, a downshift from fourth to third gear leaves the relay 421 operated long enough to bring on the relay 311 with resulting energization of relay 750 to reverse its armatures 751 and 752; if the system operates under pull, switch 76 is in its illustrated position and grounds the lead 77. In order that relay 430 can respond to retard the release of selection relay 45, as described above with reference to FIG. 1, an ancillary delay circuit 44 of small time constant maintains the energization of lead 40 for a brief interval which is short compared with the delay period of network 43. Similar ancillary delay circuits 24 and 34 are provided for leads 20, and 30. In an analogous manner, pulse generator 21 responds to a downshift to second gear by a restoration of change-over switch $S_{2-3}$, relay 321 remaining operated for a certain period after the changeover to ground the lead 73. Since, however, a changeover to first gear is always a downshift, relay 111 responds to every energization of lead 10 to operate the relay 750.

During upshift under load, with switch 76 in its alternate position, pulse generators 11, 21 and 31 are ineffectual so that relay 750 remains unoperated and lead 77 is invariably grounded, with resulting delays in the release of relays 15, 25, 35 for a period determined by the time constants of networks 13, 23 and 33.

The various delay networks or timing circuits may have adjustable impedances (condensers and/or resistors), as particularly illustrated in FIG. 3.

We claim:
1. In a speed-changing mechanism with at least three stages comprising each a hydraulic coupling element individually activable to the exclusion of the coupling elements of the other stages for establishing respective speed ratios between an engine and a load capable of developing either positive or negative reaction torques, said engine being provided with a controller for varying the supply of fuel thereto, said stages being provided with electrical valve-operating means responsive to control signals for activating said coupling elements, the mechanism further comprising circuit means for generating said control signals in response to upshifting and downshifting commands for successively activating the coupling elements of adjoining stages in sequences of increasing and decreasing speed ratios, respectively, the combination therewith of:

selection-responsive discriminating means including a first two-position switch for distinguishing between said upshifting and downshifting commands by alternately occupying an up position and down position;

load-responsive discriminating means including a second two-position switch coupled with said controller for distinguishing between positive and negative torques by alternately occupying a load position and a pull position; and switch means in said circuit means jointly controlled by said selection-responsive discriminating means for establishing a first changeover condition in response to a concurrence of said up position with said pull position, indicative of a coincidence of upshifting commands with negative reaction torques, and in response to the concurrence of said down position with said load position, indicative of a coincidence of downshifting commands with positive reaction torques, and for establishing a second changeover condition in response to a concurrence of said up position with said load position, indicative of a coincidence of upshifting commands with positive reaction torques, and in response to a concurrence of said down position with said load position, indicative of the coincidence of downshifting commands with negative reaction torques, said first changeover condition introducing a predetermined delay period between deactivation of a previously activated coupling element of an adjoining stage and activation of a coupling element of a selected stage, said second changeover condition causing activation of a coupling element of a selected stage substantially concurrently with deactivation of a previously activated coupling element of an adjoining stage.

2. The combination defined in claim 1 wherein said circuit means comprises an individual relay for each coupling element and a delay network in each stage connectable by said switch means to said relay for modifying the response time of said relay.

3. The combination defined in claim 2 wherein said coupling elements are activable without significant hydraulic retardation, said delay network being effective to retard the deactivation of the coupling element of the corresponding stage in response to a control signal for the activation of the coupling element of an adjoining stage.

4. The combination defined in claim 2 wherein said coupling elements are activable without significant hydraulic retardation, said delay network being effective to retard the activation of the associated coupling element.

5. The combination defined in claim 4, further comprising sensing means in circuit with the delay network of at least the stage assigned to the lowest speed ratio for disabling the delay network in the absence of a transient voltage from the valve-operating means of any other stage indicative of a deactivation of a previously activated coupling element in said other stage.

6. The combination defined in claim 2 wherein the delay network of at least one stage, assigned to an intermediate speed ratio, is provided with impedance-changing means responsive to the state of energization of the valve-operating means of an adjoining stage for making said delay period different for upshifting and downshifting operations.

7. The combination defined in claim 1 wherein said selector means comprising an element with an upshifting position and a downshifting position, said selection-responsive discriminating means including a contact controlled by said element.

8. The combination defined in claim 7 wherein said element has a neutral position to which it is biased to return upon a brief displacement into either of said upshifting and downshifting positions, said selection-responsive discriminating means further including slow-releasing relay means energizable by said contact.

9. The combination defined in claim 1 wherein said selection-responsive discriminating means comprises a switching circuit connected to the valve-operating means of at least one stage, assigned to an intermediate speed ratio, and timing means in said switching circuit connected to the valve-operating means of an adjoining stage for temporarily preserving a signal indicative of a recent activation of the corresponding coupling element.

10. In a speed-changing mechanism with at least three stages comprising each a hydraulic coupling element individually activable without significant hydraulic retardation to the exclusion of the coupling elements of the other stages for establishing respective speed ratios between an engine and a load capable of developing either positive or negative reaction torques, said stages being provided with electrical valve-operating means responsive to control signals for activating said coupling elements, the mechanism further comprising circuit means for generating said control signals and selector means for delivering upshifting and downshifting commands to said circuit means for successively activating the coupling elements of adjoining stages in sequences of increasing and decreasing speed ratios, respectively, the combination therewith of:

selection-responsive discriminating means for distinguishing between said upshifting and downshifting commands;

load-responsive discriminating means for distinguishing between positive and negative torques;

switch means in said circuit means jointly controlled by said selection-responsive and load-responsive discriminating means for establishing a first changeover condition upon the coincidence of upshifting commands with negative reaction torques and upon the coincidence of downshifting commands with positive reaction torques and for establishing a second changeover condition upon the coincidence of upshifting commands with positive reaction torques and upon the coincidence of downshifting commands with negative reaction torques, said first changeover condition introducing a predetermined delay period between deactivation of a previously activated coupling element of an adjoining stage and activation of a coupling element of a selected stage, said second changeover condition causing activation of a coupling element of a selected stage substantially concurrently with deactivation of a previously activated coupling element of an adjoining stage, said circuit means comprising an individual relay for each coupling element and a delay network in each stage connectable by said switch means to said relay for modifying the response time of said relay; and sensing means in circuit with the delay network of at least the stage assigned to the lowest speed ratio for disabling the delay network in the absence of a transient voltage from the valve-operating means of any other stage indicative of a deactivation of a previously activated coupling element in said other stage.

* * * * *